US006814349B2

(12) United States Patent
Migliori

(10) Patent No.: US 6,814,349 B2
(45) Date of Patent: Nov. 9, 2004

(54) CLAMPING DEVICE WITH MANUAL CONTROL LEVER

(75) Inventor: Luciano Migliori, Milan (IT)

(73) Assignee: Univer S.p.A., Milan (IT)

( * ) Notice: Subject to any disclaimer, the term of this patent is extended or adjusted under 35 U.S.C. 154(b) by 0 days.

(21) Appl. No.: 10/657,240

(22) Filed: Sep. 9, 2003

(65) Prior Publication Data

US 2004/0046299 A1 Mar. 11, 2004

(30) Foreign Application Priority Data

Sep. 10, 2002 (IT) ..................................... MI2002A1914

(51) Int. Cl.[7] .................................................. B23Q 3/08
(52) U.S. Cl. ............................ 269/32; 269/228; 269/27
(58) Field of Search .............................. 269/32, 24, 27, 269/228, 201, 91–94, 237, 238; 74/470, 105

(56) References Cited

U.S. PATENT DOCUMENTS

| | | | | | |
|---|---|---|---|---|---|
| 1,997,428 A | * | 4/1935 | Olson | .......................... | 269/94 |
| 5,823,519 A | * | 10/1998 | Tunkers | ....................... | 269/29 |
| 6,595,507 B2 | * | 7/2003 | Dykstra | ...................... | 269/228 |
| 6,739,587 B2 | * | 5/2004 | Migliori | ...................... | 269/32 |
| 2004/0046299 A1 | * | 3/2004 | Migliori | ...................... | 269/32 |
| 2004/0113342 A1 | * | 6/2004 | Tunkers | ....................... | 269/32 |

FOREIGN PATENT DOCUMENTS

| | | |
|---|---|---|
| DE | 297 01 730 | 6/1997 |
| DE | 196 45 778 | 5/1998 |
| DE | 299 20 639 | 5/2000 |
| DE | 201 00 701 | 4/2001 |
| EP | 0 406 530 | 1/1991 |
| EP | 0 803 331 | 10/1997 |

* cited by examiner

*Primary Examiner*—Lee D. Wilson
(74) *Attorney, Agent, or Firm*—Young & Thompson

(57) ABSTRACT

A clamping device for clamping work pieces; the clamping device comprises a box-shaped body, a clamping member, and a manually operable control lever; first and second toggle-lever system and an intermediate guide member are provided to connect the control lever to the clamping member of the device. The first and the second toggle-lever systems are constructed and arranged to act in correlation, in such a way that in the clamping condition of the device, the pivotal axes and the intermediate hinge axis of the second toggle-lever system, in the advanced condition of the clamping member are arranged on reference lines forming a small angle against a stop.

7 Claims, 7 Drawing Sheets

CLAMPING DEVICE WITH MANUAL CONTROL LEVER

BACKGROUND OF THE INVENTION

This invention concerns a clamping device for clamping work pieces, used in particular in the automotive field for clamping and/or centring metal sheets in the manufacture of motor vehicles, or for other similar uses.

STATE OF THE ART

For the purposes of this description, the wording "clamping device" is intended to indicate any toggle-lever gripping device having one or more clamping arms, or one or more hook-shaped members, or a device for retaining a work piece in a centred condition, while the wording "clamping member" is intended to indicate a clamping arm, or a hook-shaped member, or a member for retaining and centring work pieces, which are movable between first and second operative positions.

In general, the toggle-lever clamping devices are known and normally used for clamping work pieces on a supporting structure or against a shoulder surface.

A clamping device of the aforementioned kind, comprises a box-shaped body and a linear actuator of pneumatic, electrical or different type, onto which at least one clamping arm is pivoted to perform an angular movement between an open position and a clamping position to block a work piece against a shoulder or a supporting structure.

The clamping arm is connected to the rod of the actuator, by a toggle-lever mechanism comprising an intermediate connecting link which is hinged to a crank lever of the clamping arm, respectively to the rod of the actuator.

Devices of this kind are known for example from EP 0 803 331 and EP 0 406 530.

In devices of this kind, the clamping arm is made automatically to rotate upon opening and closing, by the same actuator.

For certain applications, or under particular conditions of use, it may be necessary for an operator to manually operate the clamping device, by acting on an appropriate control lever.

For example, DE 299 20 639 describes a clamping device of the aforementioned type, comprising a manual control lever pivotally supported to the box-shaped body of the device, in which the control lever is operatively connected to the clamping arm by a link or control rod.

In particular, the operative connection between the control lever and the clamping arm is achieved by intermediate connecting means comprising an L-shaped lever having one end connected to the rotational axis of the control lever, while the other end of the L-shaped is in the form of a fork member provided with guide rolls sliding along respective guide slots on both sides of a thrust member.

When operated, the manual control lever causes an angular rotation of the L-shaped lever and the sliding of the guide rolls along the lateral guide slots, exerting an axial force on the thrust member having an application point which moves along the guide slots, in relation to the angular position of the L-shaped connecting lever of the device.

However, said operative connection means between the control lever and the clamping arm present a number of drawbacks; in particular, since the application point of the axial thrust exerted by the L-shaped lever is laterally spaced from the longitudinal axis of the thrust member, bending moments may arise.

This gives rise to additional overstress and frictional forces with consequent greater resistance and greater wear on the movable members of the clamping device.

Another drawback concerns the fact that, in order to rotate the clamping arm by a certain degree, the control lever must be rotated by a greater angle; in this way, actuation is made less immediate and, under certain conditions of use the rotation of the control lever may be hindered or made difficult by external obstructions.

A further drawback is related to the inevitable existence of clearances and frictional forces between the rolls of the L-shaped lever and the guide slots of the thrust member, which make it problematic to accurately determine the clamping force and the lacking conditions of the work pieces.

Another example of clamping device provided with a manually operable control lever is described in DE 196 45 778, in which the manual control lever is coaxially pivoted inside a bush which constitutes the hinging axis for the clamping arm to the box-shaped body of the device.

The operative connection between the clamping arm and the manual control lever is achieved by a side pin protruding from the pivotal axis of the control lever; said pin, during the clamping movement of the device, acts upon a connecting link of a toggle-lever mechanism, whilst when the clamping device is moved in the open condition, the pin acts upon a fork member of the rod of a linear actuator.

A device of this kind, however, presents again a number of drawbacks in that the pin presents a considerable clearance when passing from the clamping to the opening condition, thereby jeopardising the device.

In addition, since said pin is acting directly on the connecting link and on the fork member of the piston rod of the actuator, it generates considerable frictional forces, which give rise again to wear as well as to difficulty in operating the clamping device.

Moreover, said linkage system does not provide any irreversibility of the clamping arm movement in the clamped condition, since no means are provided for preventing an imperfect alignment of the links; consequently clearances and working tolerances may cause a backward rotation of the clamping arm.

In substitution of the manually operable control lever, in DE 297 01 730 a pneumatic control cylinder is provided laterally and connected to-a side of a linkage by an intermediate connecting link.

The lateral disposition of the control cylinder, as well as the disposition and conformation of the links do not allow combination both of the control lever and the control cylinder as an integrated control system in a clamping device; moreover, there is a little likelihood that a linkage system of this kind, can be adapted for use with other types of clamping devices.

A further example of a clamping device with a manual control lever is described in DE 297 01 730, which comprises a box-shaped body to which a clamping arm is pivotally supported and operatively connected to a manual control lever by a linkage or a set of links having an articulation joint movable along a linear guide path.

Since in the clamped condition of the device some links of the assembly are axially aligned with each other, the existing clearances between the links prevent a stable and precise positioning of the clamping arm. This is due to the impossibility, at the end of the closing movement, with the links in an aligned condition, to exert an additional thrust or cause a further movement of the clamping arm, necessary for compensation of the aforesaid clearances and to assume, by the same clamping arm, an unpredictable position with respect to the supporting structure.

There are also known centring devices, comprising an axially movable pin, designed to engage in appropriate holes in the work pieces, and hooking devices having one or more hook members to block one or more workpieces against a supporting structure, if necessary engaging in appropriate holes in the same work pieces. A hooking device of this kind, in combination with a centring member, is for example known from DE 201 00 701, in which a manual control rod is coaxially arranged to a linear actuator; the latter is operatively connected to the hook members by cam means which again do not ensure the irreversibility of the clamping of the work pieces in the event of external thrusts.

Therefore under particular conditions of use, manual operation by an operator, may also prove necessary for the centring and clamping devices, separately or in combination with a control actuator in an integrated working form.

SCOPES OF THE INVENTION

The main scope of this invention is to provide a device for clamping or centring work pieces of the aforementioned types, which can be easily manually and automatically operated, while at the same time assuring a high clamping force, or an appropriate centring action precisely determined due to the elimination of clearances and frictional forces in the operative connection between the clamping member and a manual control lever of the device.

A further scope of this invention is to provide a device of the aforesaid types which is structurally simple and of such kind as to require a limited rotation of the control lever compared to the movement performed by the centring or clamping member, thereby considerably reducing the overall dimension problems, and at the same time achieving an easier operation of the same device.

A still further scope of this invention is to provide a manually operable device of the aforementioned types, which is capable of ensuring the irreversibility of the movement of the clamping member in the clamping condition of the device.

BRIEF DESCRIPTION OF THE INVENTION

According to a first aspect of the invention a clamping device for clamping work pieces has been provided, the device comprising:

a box-shaped body having a longitudinal axis;

a clamping member movably supported by the box-shaped body between a first or forward, and a second or rearward operative positions corresponding respectively to an open and a clamped condition of the device;

a manually operable control lever pivotally supported by the box-shaped body; and connecting means for operative connection between the clamping member and the control lever said connecting means comprising:

a guide element movable parallely to the longitudinal axis of the body;

a first toggle-lever system between the clamping member and the control lever;

a second toggle-lever system between the guide element and the control lever, said second toggle-lever system comprising first and second link members hingedly connected each others, to the guide member and to the control lever; and in that said first and second toggle-lever system are constructed and arranged to operate in correlation with each other, in such a way that the hinge axes of the link members of the second toggle-lever system, in a forward position of the clamping member are arranged on different reference lines forming an angle between each others; and stop means for stopping the second toggle-lever system in the forward position of the clamping member of the clamping device.

According to a further aspect of the invention a clamping device has been provided for holding and centring work pieces, the device comprising:

a box-shaped body having a longitudinal axis;

a retaining and centring member parallely arranged to the axis of the body, said centring member being movable supported between a first or backward position and a second or forward position with respect to the box-shaped body of the device, comprising:

a manually operable control lever being pivotally supported by the box-shaped body;

a guide element for the centring member; and connecting means between the guide element and the control lever, said connecting means comprising a toggle-lever system having link members hingedly connected to the guide member and the control lever, the hinge axis of the link members being arranged on different reference lines forming an angle between each others; and stop means being provided for stopping the toggle-lever system in the forward position of the centring member of the device.

BRIEF DESCRIPTION OF THE DRAWINGS

These and further features according to this invention, will be more clearly evident from the following description with reference to the accompanying drawings, in which.

DETAILED DESCRIPTION OF THE INVENTION

Figure 1:
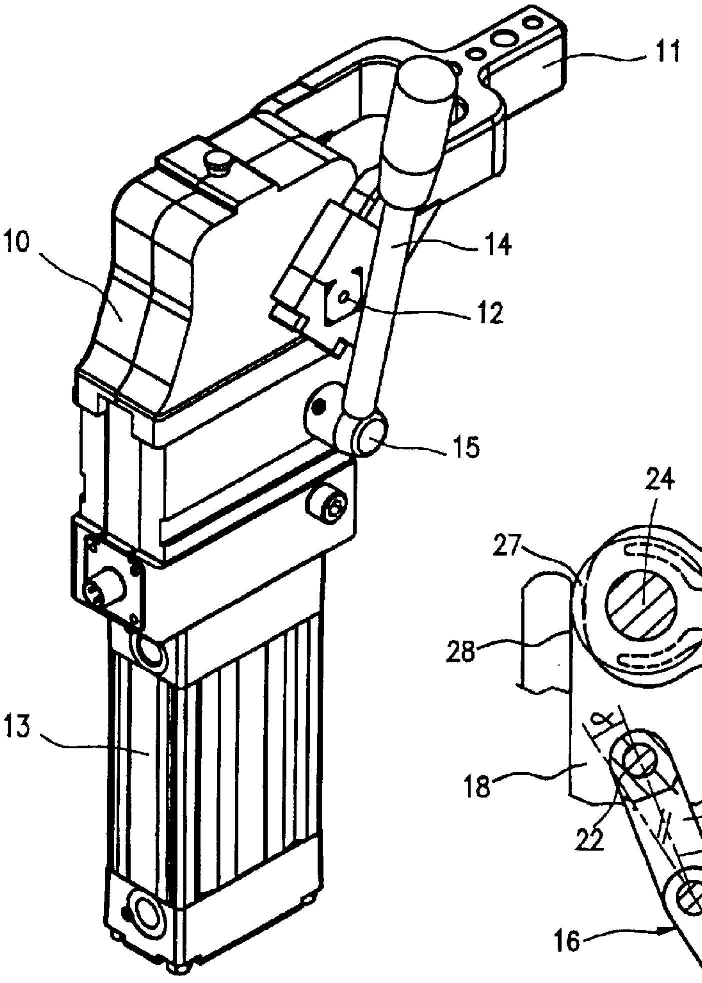
FIG. 1 shows a perspective view of a first embodiment of a clamping device with a manual control lever according to the invention.

The general features of this invention will be illustrated hereunder by means of some exemplificative embodiments.

A first exemplificative embodiment of a clamping device with manual control lever according to the invention, is shown in the FIGS. from 1 to 4.

The clamping device comprises a box-shaped body 10 having a longitudinal axis, onto which a clamping member, in the form of a clamping arm 11, is pivoted at 12 on a side, at one end of the body 10; the clamping arm 11 is operatively connected both to a linear actuator 13 such as a pneumatic cylinder supported by the box-shaped body 10, and to a manual control lever 14 pivoted to the box-shaped body 10 by means of a pivotal axis 15.

The device can alternatively be provided just with the manual control lever 14, whenever the work to be carried out involves only the manual operation of the device by an operator.

Moreover, it is also possible for the device to be provided with one or more clamping members rotatingly supported in order to satisfy particular requirements.

Figure 3:
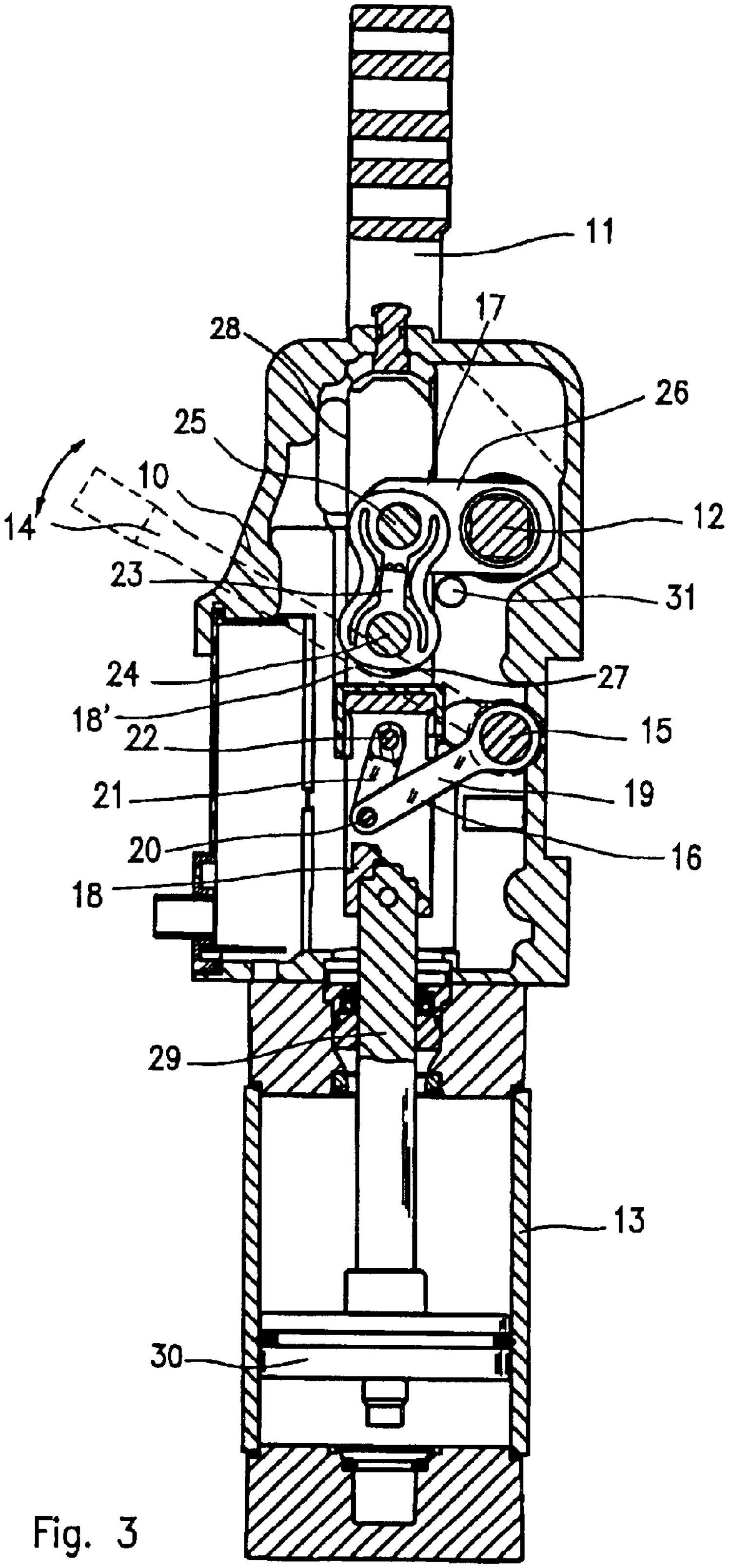
FIG. 3 shows a longitudinal view of the device of FIG. 1 in the open condition.
Figure 4:
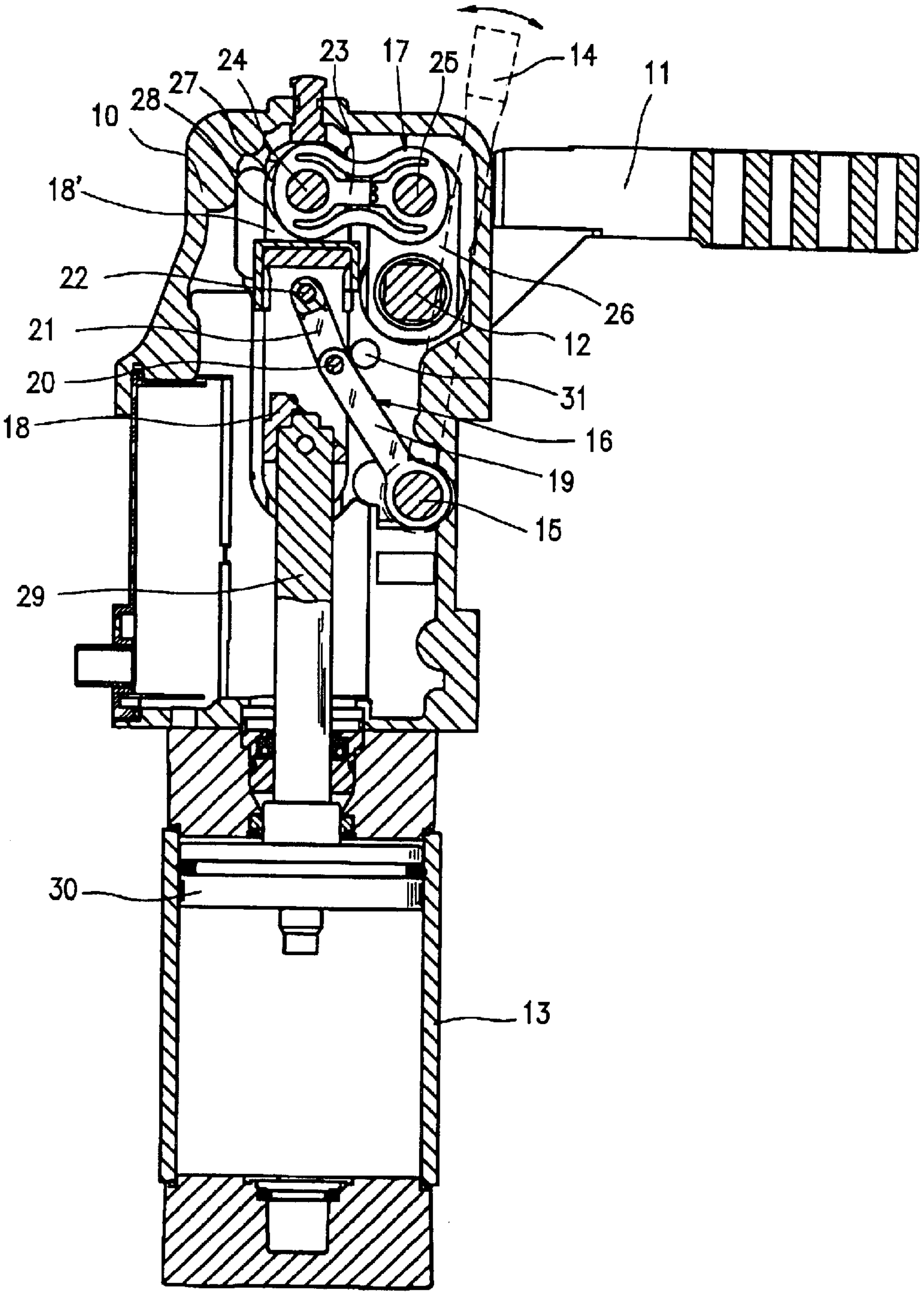
FIG. 4 shows a longitudinal view of the device of FIG. 1 in the clamped condition.

The clamping arm 11 rotates around the pivotal axis 12 to alternately move from a first rearward or open operative position, shown in FIG. 3, to a second forward or clamping operative position, shown in FIG. 4, in which the arm 11 blocks a metal sheet or a work piece against a shoulder or a support framework, not shown.

The clamping arm 11 is operatively connected to the manual control lever 14 by a double toggle-lever system comprising a first toggle-lever system 16 and a second toggle-lever system assembly 17 connected to each other by means of an intermediate guide element 18 sliding parallel to the longitudinal axis of the box-shaped body 10.

In particular, the first toggle-lever system 10 connected to the control lever 14, comprises a first link 19 connected to the hinging and pivotal axis 15 of the control lever 14, as well as hinged at 20 to a second link 21, which in turn is hinged at 22 to the sliding guide element 18.

The second toggle-lever system 17, on the contrary, comprises a connecting link 23, for example of the controlled elastic yielding type, hinged to a fork member 18' of the guide element 18 at a point 24, preferably different and spaced apart from the hinge point 22 of the first toggle-lever system 16, view in the direction of the longitudinal axis of the box-shaped body 10; the connecting link 23 at the same time is hinged at 25 with a second link or crank lever 26 connected to and movable with the clamping arm 11 around the pivot point 12.

The second toggle-lever system 17 is of a per se known three-point type, which is movable between a backward position of the hinge point 24 and the connecting link 24, which corresponds to a folded condition of the first toggle-lever system 16, see FIG. 3, and a forward position, which corresponds to an extended condition of the first toggle-lever system 16 as shown in FIG. 4.

The guide element 18 and the connecting link 23 of the second toggle-lever system 17, in correspondence with their hinge axis 24, are provided on both sides with guide rolls 27 which are movable along respective sliding guides 28 along the box-shaped body 10, so as to guide the element 18 in a direction parallel to the longitudinal axis of the box-shaped body 10 of the clamping device.

In a three point construction of the second toggle-lever system 17, the same reaches a dead centre condition when the hinge points 24,25 of the connecting link 23 are aligned with the contact points between the guide rolls 27 and the guides 28 of the body 10.

Therefore, according to the invention, the first and the second toggle-lever system 16, 17 are constructed and disposed to act in correlation with each other, in such a way that in the forward position of the second connecting link and the clamping arm 11, the pivotal or hinge axes 15,22 and the intermediate hinge axis 20 of the first toggle-lever system 16 are not aligned with one another, that is are laying on two different reference lines A and B forming a small angle $\alpha$ as explained furthermore, while the second toggle-lever system 17 is in the aforesaid forward condition of irreversibility of its movement, just a little beyond its dead centre, to maintain the clamping arm 11 in the forward condition in which it clamps a work piece, even in the event of accidental thrusts acted upon the clamping arm 11 is tending to open it.

The linear actuator 13, for example a hydraulic or pneumatic cylinder, whenever contemplated, is provided at rear end of the box-shaped body 10, and is operatively connected to the guide element 18 for the first and the second toggle-lever systems 16,17 by means of a piston rod 29.

The piston rod 29 has an axis parallel to the longitudinal axis of the box-shaped body 10, and is connected to a movable member of the linear actuator 13, for example a piston 30 of a pneumatic cylinder.

The guide element 18 is preferably in the form of a bush having a longitudinal slit which opens out on both sides, which is also provided with side guide shoes, not shown, on orthogonal planes to the hinge axes 22, 24 of the connecting links 21, 23; said guide shoes are longitudinally spaced apart from the rolls 27 of the guide element 18, so as to allow the: guide element 18 to slide only longitudinally, preventing any rotation or oscillations.

The connecting link 21 of the first toggle-lever system 16 is preferably housed and pivoted inside the bush-shaped guide element 18, with the crank link 19 of the first toggle-lever system extending into the guide element 18 through one of the longitudinal slits.

The longitudinal slits of the guide element 18. also offer the first toggle-lever system greater possibilities of rotating, since it is able to partially protrude with respect to the guide element 18, allowing a smaller rotation of the control lever 14 while reducing the overall side dimensions of the device.

Figure 2:
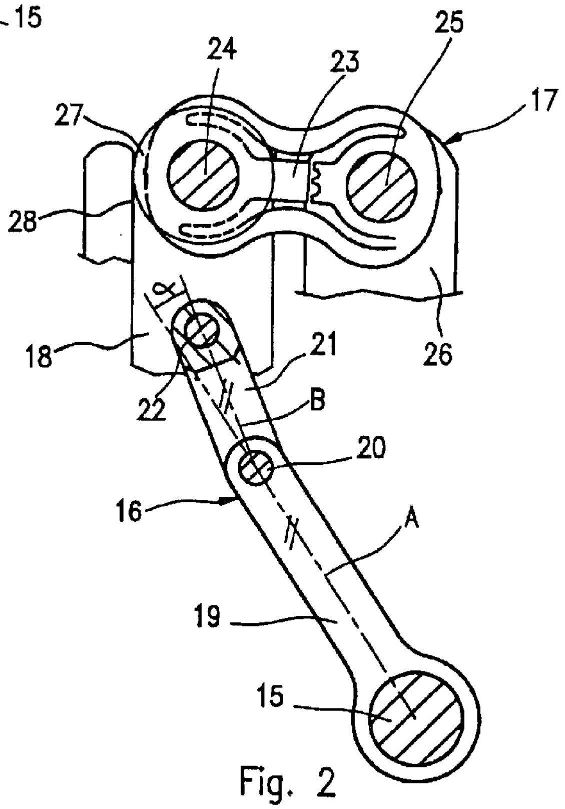
FIG. 2 shows the first and the second toggle-lever system of FIG. 1, in the clamped condition of the device.

To this purpose, as shown in FIG. 2, the distance between the hinge axes 15 and 20 is greater than the distance between the hinge axes 20, 22, so that it is possible to rotate the control lever 14 by a smaller angle than the clamping arm 11 of the device.

The first toggle-lever system 16, in correspondence with its extended condition, is stopped by stop means, such as for example a peg 31 secured to the box-shaped body 10, which preferably comes into contact with the link 19 thereby preventing the links 19 and 21 from assuming an aligned condition of the hinge axes.

Preferably, the angle $\alpha$ formed between the longitudinal axis or reference line A of the link 19 and B of the link 21 of the first toggle-lever system 16, in correspondence with the clamped condition of the device, is smaller than 6°, for example ranging from 2° to 6°, thereby making it possible to at least partially exploit the thrust of the first toggle-lever system 16 in order to generate a high clamping force.

The use of the first toggle-lever system 16 to operatively connect the control lever 14 to the clamping arm 11, due to the absence of couplings and sliding elements, makes it possible to eliminate clearance and frictional forces in the connection, thereby enabling a precise determination of the clamping force exerted by the clamping arm 11.

Figure 5:
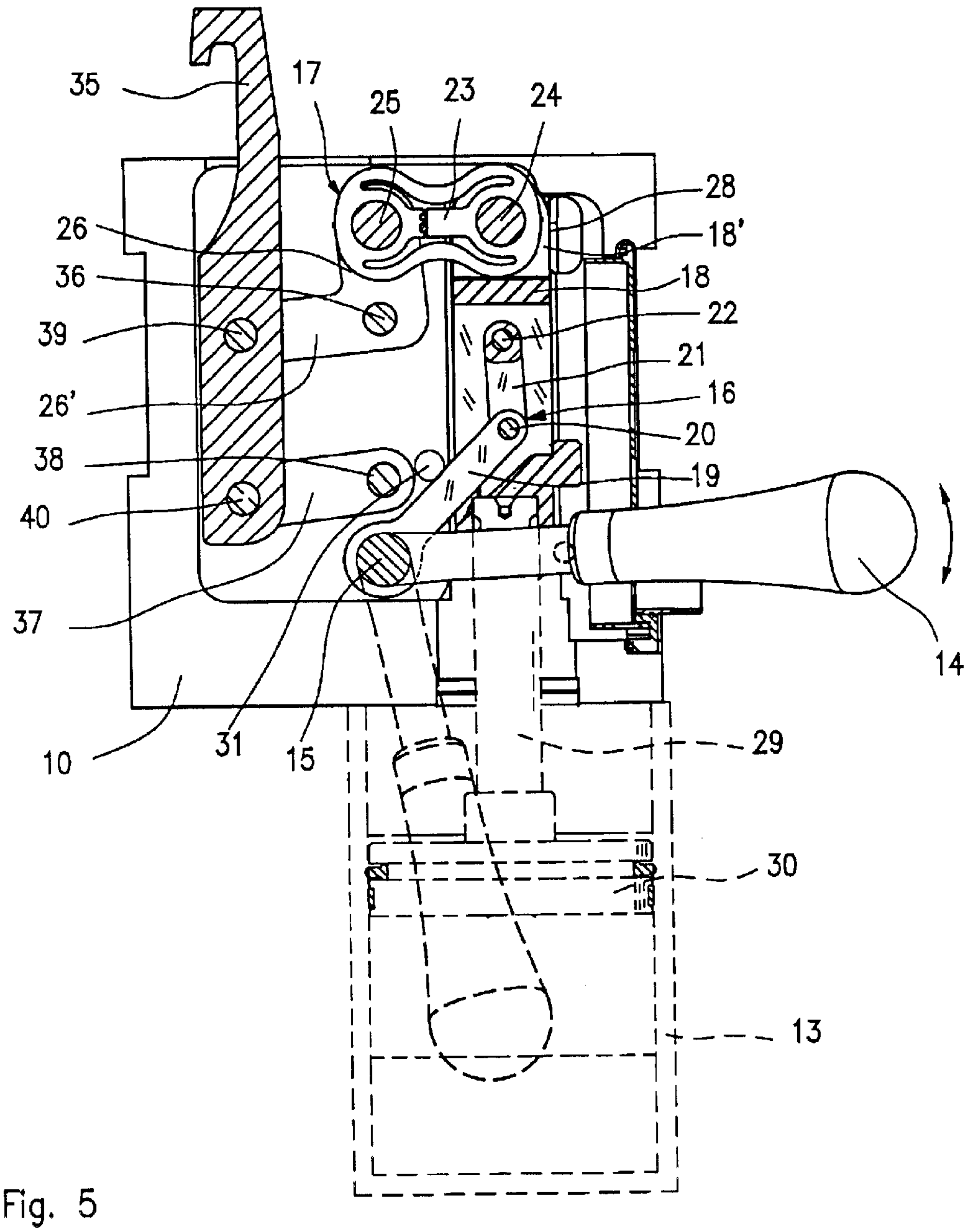
FIG. 5 shows a longitudinal view of a second embodiment of a clamping device with a manual control lever according to the invention.

A second exemplificative embodiment concerns a clamping device, as shown in FIG. 5, in which the same reference numbers have been used to indicate similar or equivalent parts.

The clamping device also comprises a manually operable control lever 14 pivoted to the box-shaped body 10, which is operatively connected to at least one hook-shaped member 35 capable of clamping and/or pressing a work piece against a supporting structure.

The operative connection between the control lever 14 and the hook member 35 is also achieved by means of a first toggle-lever system 16 comprising a link 19 connected to rotate with the control lever 14 and a connecting link 21 hinged at 20 to the link 19 and at 22 to a guide element 18 sliding along the box-shaped body 10.

The guide element 18 is in turn hingedly connected to a second toggle-lever system 17 comprising a connecting link 23 hinged at 24 to the guide element 18, and at 25 to the link arm of a crank lever 26; an L-shaped extension 26' of the crank lever 26 constitutes one side of an articulated quadrilateral system which controls the movement of the clamping hook 35 and enables its operative connection with the second toggle-lever system 17.

In particular, the articulated quadrilateral comprises the L-shaped extension 26' of the crank lever 26, pivoted at 36 to the box-shaped body 10; a connecting rod 37 is pivoted at 38 to the box-shaped body 10, while the L-shaped extension 26' and the connecting rod 37 are hinged to the hook member 35 at respective hinging points 39,40 spaced apart from each other.

Thus, by manually acting on the control lever 14, the hook member 35 moves from a first raised operative position to a second lowered or clamping operative position, in which the hook member 35 presses and/or retain a work piece against a supporting structure, engaging in a hole provided into the work piece.

Whenever it is required to automatically control the clamping hook 35, the device can again comprise a linear actuator 13, secured to the box-shaped body 10, having a rod 29 operatively connected to the guide element 18.

Likewise to the preceding example, the first and the second linkages or toggle-lever systems 16, 17 are constructed and arranged to act in correlation with each other, in such a way that in the forward position of the second toggle-lever system 17, the pivotal axes 15,22 and the intermediate hinging axis 20 of the first toggle-lever system 16 are not aligned with one another, while the second toggle-lever system 17 is in the aforesaid forward condition, that is in a condition of irreversibility of its movement, just a little beyond its dead centre, to retain the clamping arm 11 in the clamped condition.

The condition of alignment between the pivotal axes 15,22 and the intermediate hinging axis 20 of the first toggle-lever system 16 is prevented thanks to a stop element 31.

A further embodiment of the invention concerns a clamping device for retaining and centring work pieces, as shown in the FIGS. from 6 to 8, in which the same reference numbers have been again used to indicate similar or equivalent parts.

Figure 6:
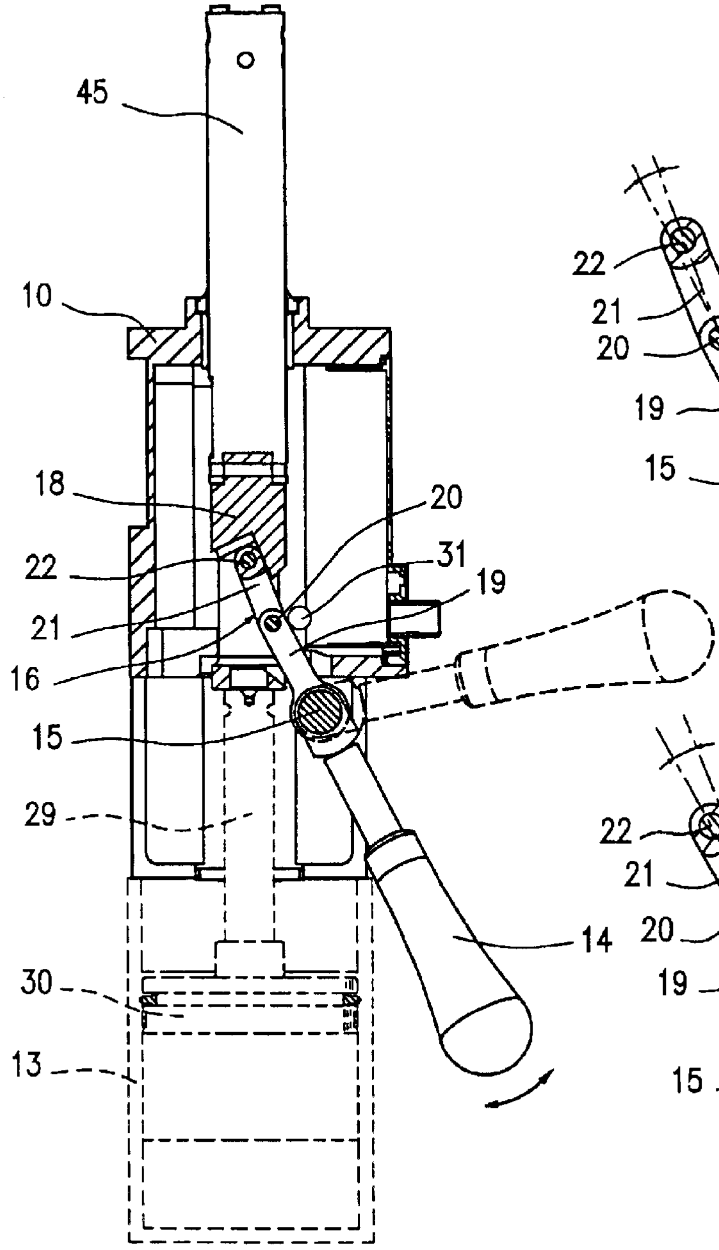
FIG. 6 shows a longitudinal view of a centring device with a manual control lever according to the invention.

The centring device comprises a box-shaped body 10 having a longitudinal axis, along which a centring and retaining member, for example a centring pin 45, slide parallely to the axis of the body 10 between a first backward position and a second forward position shown in FIG. 6.

The device also comprises a manually operable control lever 14 pivoted at 15 to the box-shaped body 10 and operatively connected to the centring member 45 by connecting means; the said connecting means in turn comprise a toggle-lever system 16 having a link 19 connected to the pivot pin 15 of the control lever 14, and a second link 21 pivoted at 22 to a guide element 18 longitudinally sliding along the box-shaped body 10, with the links 19 and 21 hinged each other at 20.

In the forward position of the centring member 45, the pivotal axes 15,22 and the intermediate hinging axis 20 of the toggle-lever system 16 are not aligned with one another, due to the stop pin 31.

Figure 8:
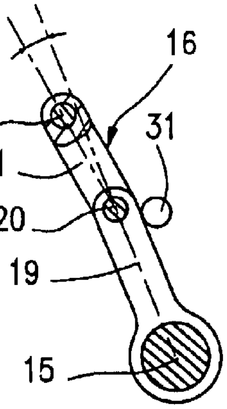
FIG. 8 shows the disposition of the links of the toggle-lever system of the device of FIG. 6, in the clamped condition, in which use of a control lever only is made.

In the event of the centring member 45 being connected to the control lever 14 only, the toggle-lever system 16, in correspondence with the forward position of the centring member 45, shifts beyond its aligned condition, and comes to rest against the stop pin 31, as shown in FIG. 8, thereby reaching a condition of irreversibility of its movement, in which. an accidental thrust exerted on the centring member 45 cannot cause it to move backwards.

Figure 7:
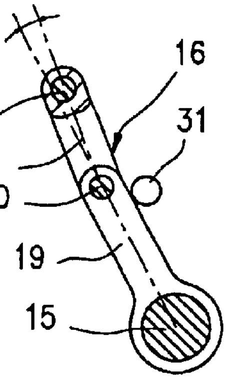
FIG. 7 shows the disposition of the links of the toggle-lever system for the device of FIG. 6, in the clamped condition, in which use of an actuator is made.

Conversely, in the event of the centring member 45 being also controlled by a linear actuator 13 operatively connected to the guide element 18, the toggle-lever system 16, in correspondence with the forward position of the centring member 45, does not reach its alignment condition, as shown in FIG. 7.

Figure 9:
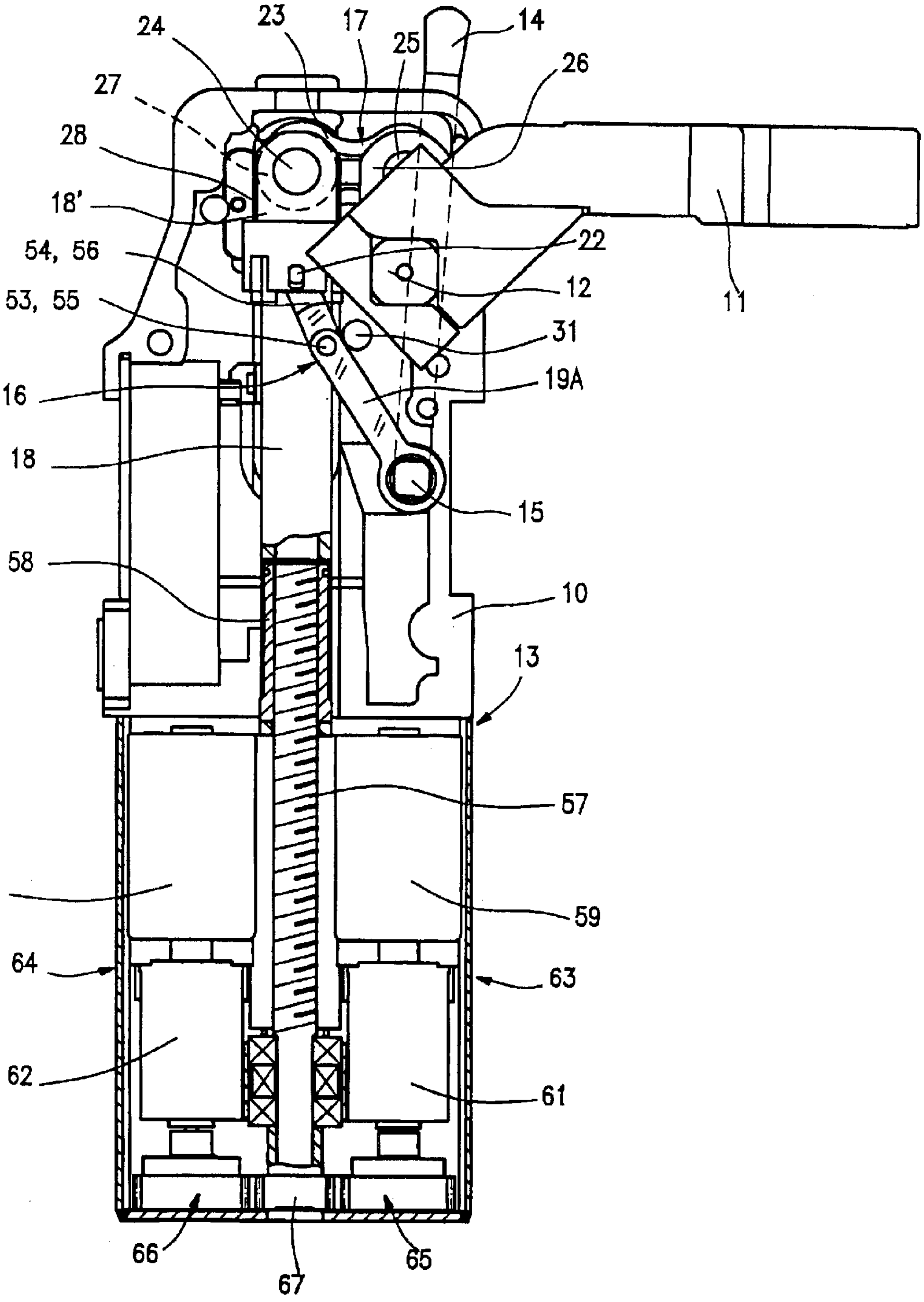
FIG. 9 shows a longitudinal view of a clamping device comprising an electrical actuator.
Figure 10:
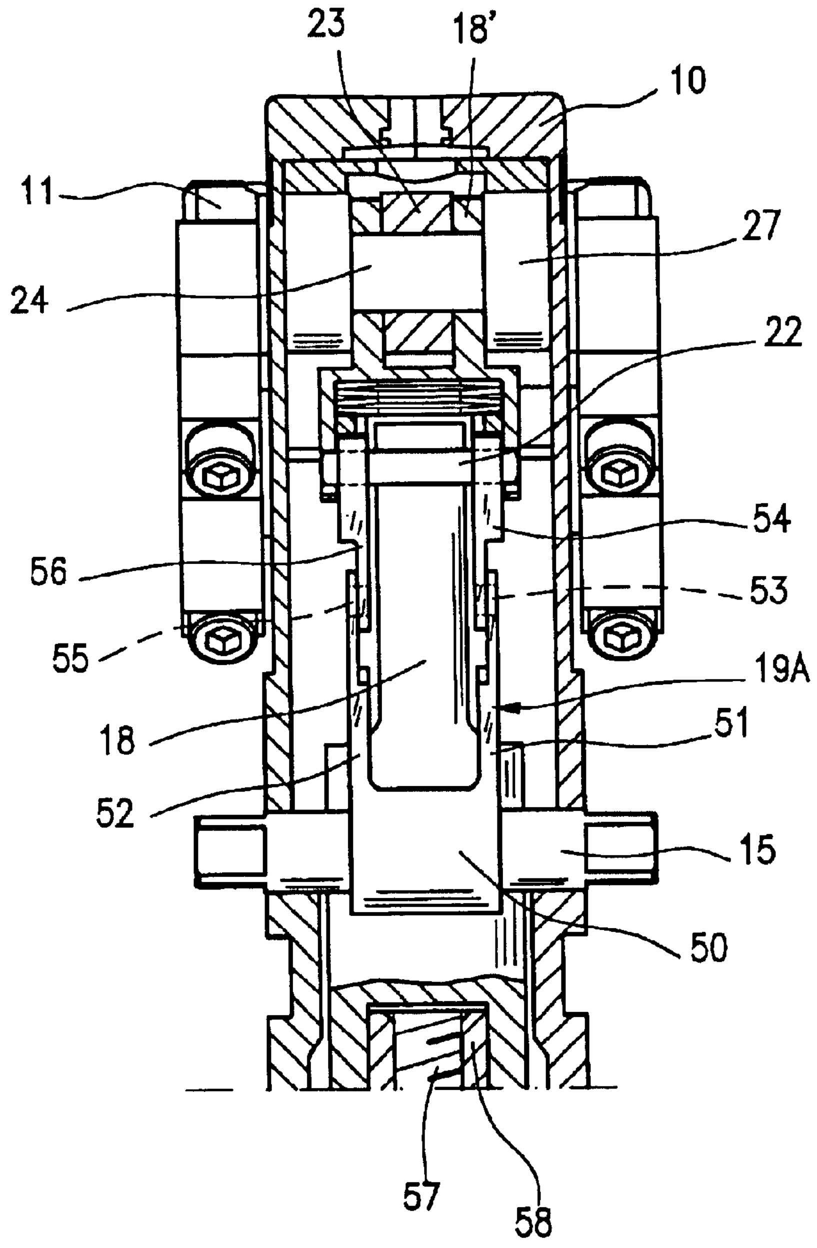
FIG. 10 shows a cross-sectional view of the clamping device of FIG. 9.

A further exemplificative embodiment concerns a clamping device as shown in FIGS. 9 and 10, in which the same reference numbers have been used again to indicate similar or equivalent parts.

The clamping device again comprises a box-shaped body 10 having a longitudinal axis, and a clamping arm 11 operatively connected both to a linear actuator 13, in this case of the electric type, and to a manually operable control lever 14 pivoted to, the same box-shaped body 10 by means of a pivot pin 15.

The clamping arm 11 is operatively connected to the manual control lever 14 by connecting means comprising a first toggle-lever system 16 and a second toggle-lever system 17 connected to each other by means of an intermediate guide element 18 sliding longitudinally along the box-shaped body 10.

The first toggle-lever system 16 differs from the one described in the first embodiment of FIG. 1, in that it comprises a crank member 19A in the form of a fork, connected to the pivot pin 15 of the control lever 14; the fork member 19A preferably comprises a hub 50 coaxially arranged to the pin 15, provided with a first and a second arm 51,52 disposed on the opposing sides of the guide element 18.

The first arm 51 of the fork member 19A is hinged at 53 to a corresponding first connecting link 54; likewise the second arm 52 of the fork member 19A is hinged at 55, to a second connecting, link 56.

The first and the second connecting links 54,56 are disposed on the opposite sides of the guide element 18, and are hinged to the same guide element 18, at the point 22.

The second toggle-lever system 17 again comprises a connecting link 23, for example of the controlled elastic yielding type, hinged to a fork member at a point 24, spaced apart from the pivotal point 22 as per case of FIG. 1; the connecting link 23 is also hinged at 25 to a link or a crank lever 26 connected to the clamping arm 11.

The first and the second toggle-lever systems 16,17 are again constructed and arranged to act in correlation with each other, in such a way that in the forward position of the clamping arm 11 and the second toggle-lever system 17, the pivotal axes 15 and 22 and the intermediate hinging axes 53, 55 are not aligned with one another, as in the previous cases 17.

In this example, the linear control actuator 13 comprises a worm screw 57 axially disposed to the box-shaped body 10, which in turn is coupled with a nut screw 58 connected to the guide element 18.

The worm screw 57 is operatively connected to an electric actuator comprising in this case a first and a second electric motor 59,60, and a torque transmission system.

In particular, each electric motor 59,60 is connected to respective epicyclic reduction gears 61,62, so as to form a first and a second geared motor unit 63,64.

Each geared motor unit 63,64 is operatively connected to a respective geared torque converter 65,66; the geared torque converters 65,66 are in turn connected to a central gear 67 of the worm screw 57.

What has been described and shown with reference to the accompanying drawings, has been given purely by way of example in order to illustrate the general features of the invention, and some preferred embodiments; consequently, other modifications and variations to the clamping device are possible, without thereby deviating from the scope of the claims.

What I claim is:

1. A clamping device for clamping work pieces, comprising:

a box-shaped body having a longitudinal axis;

a clamping member movably supported by the box-shaped body between a first or forward, and a second or rearward operative positions corresponding respectively to an open and a clamped condition of the device;

a manually operable control lever pivotally supported by the box-shaped body; and connecting means for operative connection between the clamping member and the control lever said connecting means comprising:

a guide element movable parallely to the longitudinal axis of the body;

a first toggle-lever system between the clamping member and the control lever;

a second toggle-lever system between the guide element and the control lever, said second toggle-lever system comprising first and second link members hingedly connected each others, to the guide member and to the control lever; and in that said first and second toggle-lever system are constructed and arranged to operate in correlation with each other, in such a way that the hinge axes of the link members of the second toggle-lever system, in a forward position of the clamping member are arranged on different reference lines forming an angle between each others; and stop means for stopping the second toggle-lever system in the forward position of the clamping member of the clamping device.

2. A clamping device according to claim 1, wherein the hinge points of said first and second toggle-lever systems for connection to the guide element, are spaced apart in the direction of the longitudinal axis of the box-shaped body.

3. A clamping device according to claim 1, wherein the guide element is operatively connected to a linear actuator.

4. A clamping device according to claim 1, wherein the link connected to the control lever of the second toggle-lever system has a length greater than the link connected to the guide element of the clamping device.

5. A clamping device according to claim 1, wherein the clamping member is in the form of a rotatingly supported clamping arm.

6. A clamping device according to claim 1, wherein the clamping member is in the form of a hook-shaped member operatively connected to the guide element by said first toggle-lever system and an articulated quadrilateral system.

7. A clamping device for holding and centering work pieces, the device comprising:

a box-shaped body having a longitudinal axis;

a retaining and centering member parallely arranged to the axis of the body, said centering member being movable supported between a first or backward position and a second or forward position with respect to the box-shaped body of the device, comprising:

a manually operable control lever being pivotally supported by the box-shaped body;

a guide element for the centring member; and connecting means between the guide element and the control lever, said connecting means comprising a toggle-lever system having link members hingedly connected to the guide member and the control lever, the hinge axis of the link members being arranged on different reference lines forming an angle between each others; and stop means being provided for stopping the toggle-lever system in the forward position of the centering member of the device.

* * * * *